Patented Feb. 18, 1930

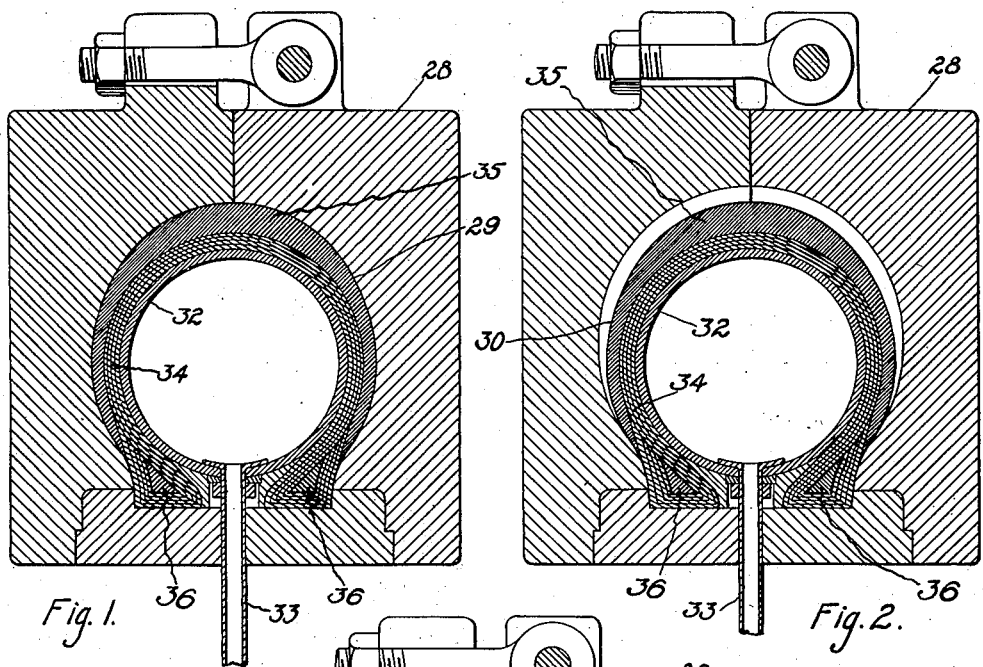
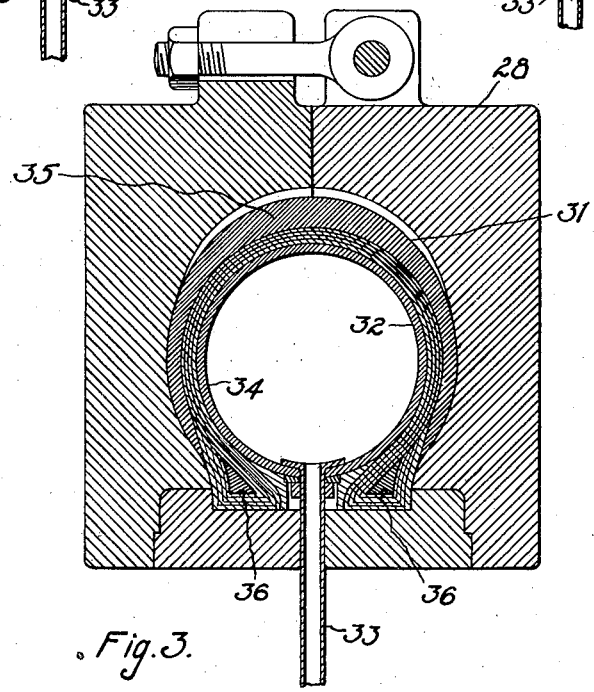

1,747,533

UNITED STATES PATENT OFFICE

FRANK L. SESSIONS, OF LAKEWOOD, OHIO

PROCESS OF TREATING TIRE FABRICS

Application filed March 23, 1922. Serial No. 545,959.

My invention perhaps finds its greatest field of usefulness in the manufacture of pneumatic tire casings of built-up fabric and rubber structures. The principal object of my invention is to provide a process of treating fabric, such as the cotton, canvas or cord, fabric used in the manufacture of automobile tire casings, which results in more durable casings than have heretofore been made excepting by the employment of more expensive processes. Other objects of my invention are;—to provide a process of making automobile tire casings which reduces the expense of air bags; to provide a process of treating the threads or cords of the fabric which is to be built into the tire casing whereby said threads or cords are all stretched to substantially the same point of their stress-strain curves during the process of curing; and to provide a process of making tires which will insure that the threads or cords of the tire will be substantially equally stressed by the air under pressure in said tires while in service, and that they will be expanded and will contract substantially equal amounts under increase or decrease, respectively, of the air pressure within the tire.

In the manufacture of canvas or cord fabric and raw rubber tire casings, that have heretofore been made, two general methods have been employed. In both of these methods the rubberized fabric is laid, layer upon layer, circumferentially upon a suitable annular core, in strips of suitable widths. As it is being laid upon the core, each strip is stretched circumferentially of the core thus separating the cords or threads, somewhat, as compared to their spacing in the original fabric. The sides of the strip forming the first layer of fabric are "milled" or "stitched" down smoothly upon the sides of the core and each succeeding layer is laid and smoothed down upon the preceding layer. In this operation of "milling" or "stitching", the cords or threads of the fabric are forced closer together at the sides and towards the center of the major diameter of the core than they are at its outer circumference, due to the smaller circumference of the core in its side zones nearer the center of its major diameter. Whether canvas or cord fabric be used, the strips of the fabric are cut on a bias so that the threads or cords cross the central circumferential plane of the core at an acute angle, generally about 45°, alternate layers or alternate groups of layers being laid crisscross of each other; the sides of the strips of the canvas or cord fabric, or the bead loops of the cords (if the fabric be formed directly upon the core by winding a single cord back and forth thereon), are suitably secured to the bead rings of the casing; and the uncured, raw-rubber treads and sides are then applied to the casing in well known manners.

From this point on in the known manufacture of tire casings, the two general methods above mentioned differ. By one method known as the "full mould" method, the uncured casing. formed as above described, is not removed from the forming core but the casing and the core upon which it is built are placed inside of a mould of such dimensions and so shaped that it will give the tire the desired outer surface and form, and the casing is then vulcanized or cured in the mould by being subjected to the proper temperature and pressure for the proper length of time, after which the casing and core are removed from the mould, and the core, which is made suitably collapsible, is removed from the casing. The full mould method has been and is largely used for making tires in which canvas fabric is used.

In the other of the two general methods mentioned above, which is known as the "air bag" method, the uncured casing with its uncured rubber tread and sides built upon it, in the manner described above, is first removed from the collapsible forming core and an air bag similar in shape to that of the well known, tire inner-tube is inserted into the uncured casing in place of the core. The casing containing the air bag is next placed within a mould which, under known practices, is of larger dimensions than the outside dimensions of the uncured casing when it is placed in the mould. The mould which is made in halves to permit the insertion and removal of the casing is now securely bolted together. A certain quantity of water, (about a pint and a half in practices which I have observed), is put into the air bag, and internal pressure, generally that of compressed air, is applied inside the air bag and the casing is cured or vulcanized, in a manner with which those skilled in the art are familiar, while the internal pressure is maintained within it during the curing process. In fact, at the temperature required for curing the rubber, the internal pressure becomes greater than that with which the air bag was inflated, causing the fabric of which the casing is built up to expand and force the rubber tread and sides of the casing into contact with the inner surface of the mould at all points. In practice, the relative dimensions of the uncured casings and the moulds in which they are cured are made so that the threads or cords of the fabric built up in the casing structures are stretched from six to ten percent of their length and are held in this condition of elongation during the curing process with the end in view that subsequently, when the tire is in service, the pressure of inflation will not stretch the threads or cords beyond the amount that they have been stretched during the curing process; and, further, that they may all be in condition to equally resist the pressure of inflation while in service. This "air bag" method is extensively used in making tires in which cord fabric is used.

That the air bag method produces better tires than the full mould method has been conclusively demonstrated. Of cord fabric tires which were built under my personal direction and supervision, using identically the same quality and quantity of materials and forming them upon similar cores, but curing some of the tires by the full mould and others by the air bag method, those which were cured by the air bag method, upon destructive test, ran from 5 to 8 times as many miles before failing as did those which were cured by the full mould method.

The air bag method of manufacture is more expensive than the full mould method on account of the labor and equipment and also on account of the cost of the air bag, the life of which is very short as it includes in its make up partially cured rubber which rapidly becomes over cured and deteriorates with repeated use. One of the difficulties encountered in the use of these air bags is that when the air bag is inserted into the casing the latter is considerably smaller than it is when the air bag has been inflated and the casing has been expanded and is being cured in the mould. The air bag, as well as the tire casing, becomes cured when it is thus expanded so that when the air bag is inserted into the next uncured casing it is larger than the inside dimensions of the unexpanded casing and becomes wrinkled, rolled or folded when inflated so that when it is again expanded in use it may break and by breaking destroy the casing due to the absorption of the water from the air bag by the fabric of the casing, or, at least, so injure the casing as to reduce its value if not entirely destroy it.

Tires made by the air bag method in which no provision is made for the expansion of the uncured casing in the mould during the curing of the casing are no better than tires made by the full mould method as in both instances there is no longitudinal stretching and tensioning of the threads or cords of the fabric during the curing process. The subsequent inflation of the tire in service elongates the threads or cords of the fabric, causes them to pull away from the rubber with which they are surrounded and subjects some of them to greater stress than others due to their different conditions of stress during the curing process. In use such tires develop internal friction and heating, which causes rapid deterioration and results in greatly reduced mileage as compared to that of casings made by the air bag method in which the threads or cords of the fabric are considerably stretched during the curing process.

I have discovered that threads or cords made from fabrious material such as cotton have certain stress-strain characteristics and my invention is based upon these discoveries. To enable one skilled in the art to clearly understand and practice my invention reference will be made to the accompanying drawings in which—

Fig. 1 is a cross section of a tire casing and mould showing a casing completely filling the curing mould;

Fig. 2 is a cross section of a tire casing and mould in which the tire casing does not fill the mould;

Fig. 3 is a cross section of a tire casing and mould similar to Fig. 2 excepting that the casing more nearly fills the mould than does that one shown in Fig. 2;

Figure 4:
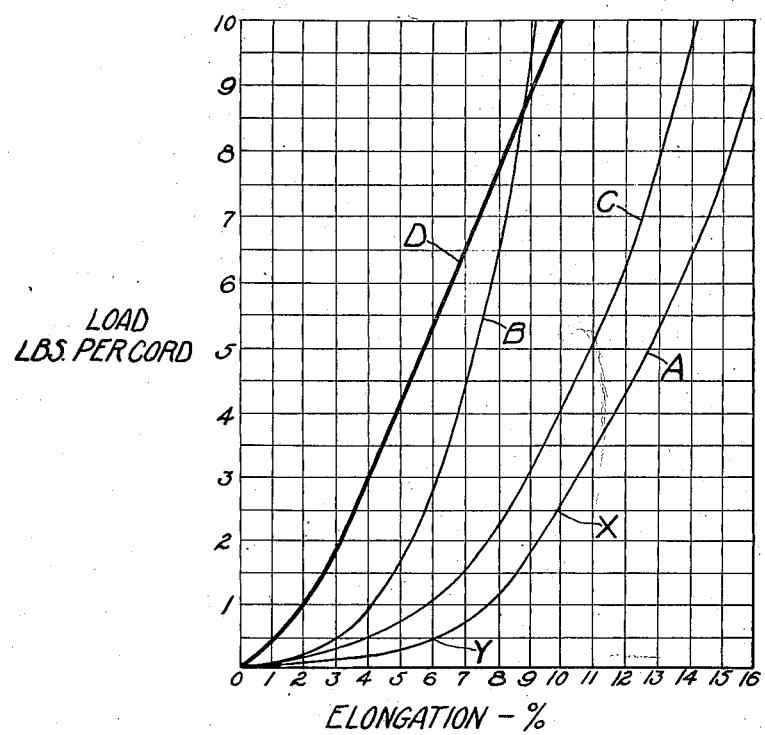
Fig. 4 is a chart of stress strain-curves of tire fabric cords.

I have found that when threads or cords are subjected to tension they at first elongate a relatively large amount per unit of tension but after being stressed up to a certain point the elongation per unit of tension rapidly decreases, the rate of decrease however becoming less with increase of tension. At an elongation of about seven to eight percent of the original unstretched length of the threads or cords, in fabrics which I have tested, the rate of decrease of elongation per unit of tension has become relatively small and beyond such elongation the elongation per unit of tension is nearly constant up to the breaking point.

After a thread or cord has been subjected to tension up to the point where the rate of elongation per unit of tension approaches a constant, it does not fully resume its original length when the tension is released; a much smaller force than that which produced the elongation will hold it elongated; and upon subsequent tensioning its stress-strain curve is quite different from what it was before the first tensioning, the upward turn or "knee" of the stress-strain curve occurring at much less elongation but at about the same tension as before. In other words the thread or cord was given a "set" in its first tensioning.

The stress-strain curve of a previously stretched thread or cord under tension in which stresses are plotted as ordinates and strains are plotted as abscissæ, shows a rather abrupt upward turn from about four to eight percent elongation, differing somewhat with different materials and with the size and character of the thread or cord. Beyond about eight percent elongation the elongation per unit of tension is much less than it is at lower points on the curve and is nearly constant.

The abrupt upward turn of the stress-strain curve just described is probably due to the manner in which the threads or cords are laid up by twisting their yarns or threads while under tension. This causes them to contract in length when the tension is released, and when they are again tensioned they offer comparatively small resistance until they are stretched to the length they had while being laid up. Up to this point the resistance to elongation is made up of the elasticity of and friction between the innumerable small spirals of the fibers of which the thread or cord is made while beyond this point the actual tensile strength of the fibers is brought into play to resist elongation.

It will be apparent from the foregoing discussion that if a tire casing be built up of fabric, the threads or cords of which have not been stretched, and cured in this condition, it will expand when subjected to internal pressure much more than it would if its threads or cords had been stretched up to at least the top of the "knee" of their stress-strain curve during the curing process. This difference in expansion under the pressure of inflation in service coupled with the fact that, if the threads or cords be tensioned during the curing process they will assume their shortest possible paths from bead to bead of the tire and be free from kinks, undulations and overlaps, must in large measure account for the difference in the durability of tires made under the respective conditions described.

In the air bag method in known use the curing mould is made sufficiently larger than the uncured tire casing to permit the threads or cords of the latter to be stretched and tensioned up to some point on or near the knee of their stress-strain curve. I have been reliably informed that when the air bag method was first introduced the moulds were made so as not to provide for any appreciable expansion of the casings or elongation of their threads or cords, but that the tires cured in such moulds were short lived and otherwise unsatisfactory. Tire manufacturers have gradually increased the size of the mould cavity until now the amount of elongation of the threads or cords during the curing process varies in the practices of different manufacturers, between about six and ten percent. The tension required to produce such elongation may be readily determined by well known methods. In cords which I have tested it is between five and fifteen percent of the ultimate strength. The number of threads or cords employed to withstand the working pressure in the tire is generally, arbitrarily, so fixed that while in service they will not be subjected to greater stress or strain than that to which they were subjected during the curing process and to provide a factor of safety of from six to ten.

In my invention, the threads or cords of the fabric, whether it be canvas or cord fabric, are stretched a predetermined amount and given a more or less permanent set before they are built into the tire so that when they are subsequently stretched by the expansion of the air bag in the curing mould the elongation of the threads or cords is not only less but it is also more uniform than it is where they have not been preliminarily stretched such a predetermined amount. In my process the curing mould need be only slightly larger than the uncured casing. Due to this preliminary stretching of the fabric threads or cords the expansion of the casing, and consequently the expansion of the air bag, in the mould is much less than in heretofore used air-bag methods, and, after the air bag has been used in the curing operation of a casing built of fabric treated by my process, it is only slightly enlarged from its original size. The air bag may therefore be used over and over again many more times, before it becomes unfit for further use, than is possible under heretofore practiced air bag expansion methods.

Tires made by the full mould or by the non-expanding air bag methods described herein but using fabric, the threads or cords of which have been treated according to my invention, are much more durable than tires made by either of those methods using fabric, the threads or cords of which have not been so treated.

In Fig. 4, A is the stress-strain curve plotted from an actual test of a cotton cord such as is used in many well known makes of cord fabric tires for automobiles. The cord tested had a diameter of about .030 inch, and was made by twisting together three threads, each about .015 inch in diameter, each thread being composed of five yarns, each yarn of about .004 inch in diameter. Curve A was plotted from readings taken upon the first stressing of the cord. The ultimate strength of cords of this character was found to be about thirteen pounds. After gradually stressing the cord to nine pounds as shown by curve A, the tension was relieved and the cord was again gradually stressed. Curve B was plotted from the second stressing.

Curve C is the stress-strain curve of a cord similar in every way to that one from the tests of which, curves, A and B were plotted. The cord from which curve C was plotted was first elongated about ten percent of its length and held thus elongated for a short time. Its stress-strain curve was then plotted and is reproduced as curve C of Fig. 4.

Curve D is the stress-strain curve of a cord originally similar to the original cords from which curves A, B and C were plotted. Prior to giving the cord the test from which curve D was plotted it was elongated about ten percent and while thus elongated it was heated and pressed at a temperature somewhat above the boiling point of water. Upon the tension being released the cord contracted a small amount, compared to that which the cord from which curves A, B and C contracted after being relieved of tension, and, upon subsequent test, showed the stress-strain characteristics disclosed by curve D.

As the result of these and other experiments and research, I am of the opinion that the simultaneous stretching, heating and pressure to which the threads or cords are subjected during the process of curing by existing air bag methods, impart to them elastic or stress-strain properties or characteristics which enable tires cured by this process to withstand the wear and tear of service as they do. By my invention similar but more uniform properties and characteristics are imparted to the threads or cords in a simpler and less expensive way herein described.

In tires in which cords are used like those whose stress-strain curves are shown in Fig. 4, the number of cords which are employed to withstanding the pressure of inflation is generally such that the working tension in each cord is from about one and a half to two pounds. Assuming that it is one and one half pounds, it will be seen from an inspection of curve A, that it would be necessary to enlongate the cord about eight and one half percent of its original length to produce such a tension. If such threads or cords in a totally unstretched condition were to be embodied in a tire casing and the casing were to be cured without being expanded, it would expand in service until the resistance of the threads or cords, together with the slight resistance of the rubber, balanced the bursting pressure of the air in the tire. The threads or cords would be nearly eight and a half percent longer than they were when the rubber was cured; they would rapidly become loosened from their matrices in the rubber; and, due to resulting friction and heating, the tire would soon be destroyed. I have observed such results from such tires.

When such threads or cords in the usual unstretched and non-uniform condition are built into a tire it has been found advisable to make the curing mould of such size, relative to the size of the uncured casing, that the threads or cords are elongated about ten percent and tensioned about two and one half pounds while the casing is being cured. This expands the air bag so that, upon repeated use, it is soon destroyed.

If the threads or cords be stretched, preliminarily, in the manner the cord was stretched from which curve C was plotted, the working tension will be reached at an elongation of about seven percent; if stretched preliminarily in the manner in which the cord was stretched from which curve B was plotted, the working tension will be reached at an elongation of a little more than four percent; while, if stretched, heated and pressed, preliminarily, in the manner in which the cord was treated from which curve D was plotted, the working tension will be reached when the elongation is only about two and a half percent. To tension cords, treated as was this last mentioned one, to the same amount as that just recommended for the cord from which curve A was plotted, namely about two and a half pounds, it would be necessary to make the mould only enough larger than the uncured casing to give the cord about three and one half percent elongation.

It will be observed that in the curing of tires in which the threads or cords have been preliminarily treated to give them the stress-strain characteristics of curve D, the air bag would be stretched only about one third the amount it would be stretched in the curing of a tire in which the cords have the stress-strain characteristics of curve A. It is obvious that a larger number of tires can be cured using the same air bag repeatedly if the bag is only slightly expanded each time than if it is expanded to the degree found in practices heretofore followed. It has been found that in moulds in which no appreciable expansion of the casing in the mould is provided for, about ninety tires can be cured using the same air bag, while only twelve to fifteen can be cured using the same air bag expanded each time to elongate the threads or cords of the fabric about seven and one half percent.

It will be apparent that the smaller the stretch or expansion of the air bag is, the greater will be its useful life. The principal object of my invention is accomplished by thus prolonging the life of the air bag. This is done by preliminarily stretching the threads or cords longitudinally and giving them a more or less permanent set before they are built into the casing structure so that subsequently the desired curing tension will be accompanied by relatively small elongation; or, to put it another way, by treating them so as to reduce their elongation per unit of tension throughout the lower part of their stress-strain curves; or, to give them a preliminary, "permanent set." While this may be done by simply stretching the threads or cords before they are built into the tire casing it will be seen from a study of curves A, B and C that, to effect a radical change in their stress-strain characteristics by stretching only, they must be tensioned by a force approximating their ultimate strength which would be too severe; while, by heating or pressing, or, by both heating and pressing the threads or cords while tensioned to only about the "knee" of their original stress-strain curve, they may be given the desired elastic characteristics. I have found that so heating or pressing, or, both heating and pressing greatly increases the resiliency of threads or cords and that after subsequent elongation they return much more nearly to their original length than they do before such treatment. Their useful life is consequently increased and the desirable qualities of the tires or other structures into which they may be built is correspondingly enhanced.

Figure 5:
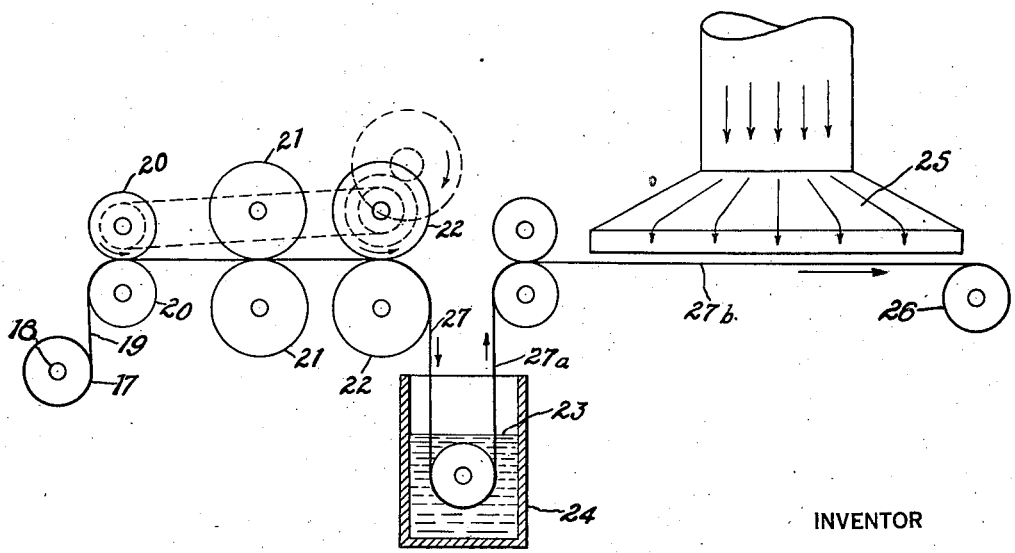
Fig. 5 is a diagrammatic representation of apparatus suitable for use in carrying out my process.

It will be apparent to those skilled in the art that various forms of apparatus may be used for carrying out my process. The apparatus which I prefer to use is illustrated in Fig. 5 in which 17 conventionally represents a roll of tire fabric supported to revolve upon a spindle, 18. The fabric, 19, as it unwinds from the supply roll, 17, passes between a pair of rolls, 20, 20, which are adapted to make adjustable pressure upon opposite sides of the fabric. It then passes between a pair of pressing or heating or, pressing and heating rolls, 21, 21, which may be heated by any suitable means such as an electric heating element, or, when properly protected by flame-proof devices, by gas flames within one of the rolls. The fabric next passes between a second pair of adjustable pressure rolls, 22, 22, after which it may, if desired, be made to pass through a rubberizing bath, 23, in receptacle, 24, thence through suitable drying means such as the hot air blast apparatus shown at 25, and finally, be rewound upon a roll-spindle, 26. If desired the threads or cords may be maintained in tension while and after passing through the rubberizing bath as in the reaches 27, 27ª and 27ᵇ, and be heated and pressed, while stretched, after being rubberized. I prefer to stretch, heat and press them before they are rubberized. The preliminary process of stretching, heating and pressing, may be done in apparatus separate and apart from the rubberizing or cementing apparatus as, after the stretching, heating and pressing process the threads or cords do not regain their original stress-strain characteristics of curve A, but retain to a large extent those of curve D.

As noted in the above description of the process, the permanent-set stretching stress, the rubberizing, and the releasing of the permanent-set stretching stress, may be performed in any desired sequence, the release of the stretching stress being effected at a selected time after it has been applied. For instance, the threads or cords or fabric may be—

(1) Stressed, released, and then rubberized; (2) stressed, rubberized while stressed and then released; (3) rubberized, stressed, and then released.

In view of the modifications of the process as described herein, the invention is not limited to any particular sequence for performing these operations.

To tension the threads or cords of the fabric while it is being heated or pressed, the peripheral speed rolls, 22, may be made greater than that of rolls, 20, either by making the rolls, 22, of larger diameter than rolls, 20, and driving them at the same rotative speed as shown in Fig. 5, or, by making rolls, 22, and rolls, 20, of the same diameter and driving rolls, 22, at a faster rotative speed than rolls, 20, in a manner well understood in the art. It will be understood that the ratio of peripheral speeds of rolls, 20 and 22, should be made to produce the desired elongation in the threads or cords. I have found that about ten per cent elongation gives satisfactory results. The rolls, 20, 20, and 22, 22, should be adjusted to prevent the fabric from slipping between them.

Any other suitable means may be employed for stretching the threads or cords of the fabric. The apparatus shown in Fig. 5 is adapted to stretch separate threads or cords or the longitudinal threads or cords known as the "warp" of a fabric and is especially adapted to stretch so called "cord" fabric in which the transverse threads or cords, known as the "woof" of the fabric, either consist of small, weak threads spaced apart about three-eighths of an inch or are omitted altogether. I do not, however, limit my invention to the treatment of the threads or cords used in the manufacture of so-called "cord" tires as it is evident that the same treatment, if given to the threads or cords of canvas fabric, would be equally advantageous. Neither do I limit my invention to the treatment of the threads or cords after they are made into cloth as, it is obvious, they may be treated by my process before being made into cloth.

Both of the rolls 21, may be made of metal, or, one may be of metal and the other may have a cloth or other cushion face similar to mangle rolls of well known construction. The rolls, 21, may be rotated by the moving fabric, 17, or they may be rotated by separate driving means at the same or at different peripheral speeds than the fabric.

Figs. 1, 2 and 3 of the drawings illustrate the relative sizes of the uncured casings and the curing moulds as used in the full mould method, the standard air bag method, and my preferred air bag method respectively. In each of these views, 28, represents the mould shown in transverse section the size of the mould cavity being varied, according to the method followed, to allow for the desired amount of expansion of the casing and the consequent elongation of the fabric threads or cords.

In Fig. 1 the tire casing, 29, is shown as completely filling the mould and represents an uncured casing of the same size as the mould. It may, however, be taken to illustrate a casing originally smaller than the mould but expanded to fill it.

In Fig. 2, 30 represents an uncured casing of such a size that it will have to be expanded an amount which will stretch the threads or cords of the fabric approximately as they are stretched in the existing air bag expansion method.

In Fig. 3, 31 represents an uncured casing of such a size that it will have to be expanded an amount which will stretch the threads or cords of the fabric about one-third as much as that shown in Fig. 2 before the casing will fill the mould. Fig. 3 illustrates, approximately, the relative size of mould and uncured casing which I prefer to use for making tires embodying threads or cords treated in accordance with my invention.

In Figs. 1, 2 and 3, the air bag is shown at 32. It is provided with the usual inflating tube, 33. The layers of threads or cords are shown at 34, the rubber tread at 35, and the tire bead-rings at 36.

From the manner in which the fabric is laid upon the forming core when a tire casing is being built up, either by hand or by so called tire building machines, it is inevitable that some of the threads or cords of the fabric will be tensioned more than others and that the condition of stretch and tension of the cords in the uncured built up casing will not be uniform. Some of the threads or cords will have been stretched but little from their original length while others will have been elongated an amount greater than that indicated at the top of the knee of their stress-strain curve. These conditions will result, when the tire is being cured in an expanded condition, in some of the threads or cords being stressed to a point considerably above the knees while others will be stressed to points below the knees of their stress-strain curves.

After such a tire is put into service those threads or cords which were stressed above the knee of their stress-strain curve during the curing process will have to withstand a greater tensile stress than will those which were stressed to lower points upon their stress-strain curve during the curing process. This can readily be deduced from a study of curve A, Fig. 4.

Let it be assumed that of two cords, $x$, $y$, lying side by side one of them, $x$, was stressed to the point X and the other, $y$, only to the point Y during the curing process. After the tire embodying such cords is put into service it cannot expand without stretching both of the cords being considered, but cord $x$ will offer much greater resistance to elongation than that offered by cord $y$, and, consequently, cord $x$ will assume the major part of the load. When a tire casing in which threads or cords of different stress-strain characteristics are embodied is inflated, those cords of the casing which were tensioned more than others during the curing process will bear more of the burden of withstanding the pressure of inflation while those threads or cords which were tensioned less than others will be comparatively slack. This uneven stressing of the threads or cords results in reduced life of the tire due to internal friction and heating as is well known.

By my process the threads or cords are all given a preliminary "stretch" of a predetermined amount to produce more or less of a "permanent set" so that when they are being built into a tire casing whether by hand or by machine there will be only slight differences in their elongation, because their "stretch", that is to say, the elongation, represented by the portion of the stress-strain curve below the knee, will have been taken out. All of the threads or cords of the tire casing will consequently have substantially the same elastic or stress-strain properties or characteristics and, when the tire is inflated, the threads or cords will be tensioned and elongated alike.

Various changes and modifications may be made in my invention without departing from its scope or spirit. While I have shown and described my invention as specifically applied to the treatment of threads or cords used in the construction of automobile tire casings and the like, I do not limit the use of threads or cords treated in accordance with my invention to such purposes, as, it is obvious, they may find other uses, such, for instance, as the making of power transmission or conveyor belting, or other structures embodying threads or cords susceptible to being benefited by my process. Nor do I limit my invention to any specific amount of preliminary tensioning or elongation of the threads or cords, as a study of the stress-strain curves shown in Fig. 4 will suggest to those skilled in the art that the greater the amount of preliminary tension and elongation given a thread or cord the smaller will be its subsequent elongation per unit of tension throughout the lower portion of its stress-strain curve. The inherent properties and characteristics of the threads or cords which are to be used and the qualities it is desired that the finished tire have, determine, to a large extent, the best specific treatment to be given in accordance with my invention herein described.

Assuming that a tire builder desires to follow applicant's process he will first determine the stress-strain characteristics of the cords, rubberized or unrubberized, that he proposes to use. He may test a single cord or a number of cords and will preferably plot the stress-strain curve which will correspond to curve A of Fig. 4, but may not be like it, as the cords he proposes to use may be different from those treated by me in plotting curve A. But in any event, the curve he will have will truly represent the stress-strain characteristics of the kind of cords he proposes to use in the condition they are to be when he will start to use them. He now knows within what ranges of stretch and stress the knee of the stress-strain curve is located.

He will next proceed in accordance with the teachings of my specification to stress one or more of the cords that are like those he is going to use up to some selected point on the knee of the stress-strain curve or above it and then, depending upon how much preliminary permanent set he desires to impart to the cords, he will either release the stretching stress, or, he will heat, press, or heat and press the cords and then release the stretching stress.

He will now determine the stress-strain characteristics of these treated cords and preferably plot their stress-strain characteristics which will correspond to the curve C or D of my Fig. 4, depending upon whether he has heated and pressed them before releasing the stretching stress, but of course may not be like either C or D for the same reasons that his first curve may differ from my curve A.

Knowing the load in pounds per cord or the elongation of the cord, or both, he desires that the cords be given during the curing process, he will consult the stress-strain data or curve of this last test and note if the desired load per cord and desired elongation occur at the same or nearly the same point on his second stress-strain curve. If they occur at about the same point he will know that the treatment he has given the test cords is the treatment to give the cords he is to use.

If he finds that at the desired tension the cords do not elongate enough to permit the casing to fill the mould during the curing process it will indicate to him that the cords have been given too much preliminary permanent set. If he finds that at the desired tension the cords elongate more than enough to permit the casing to fill the mould, it will indicate that the cords have not been given enough preliminary permanent set. In either of these events he will know that the test treatment given the cords will not produce the results he desires and he will proceed to make further preliminary tests upon cords like those he is going to use until he finds the preliminary treatment that will give the cords the desired elastic characteristics. Having predetermined such treatment he will have it carried out in accordance with my invention.

It will be understood that the predetermination of the preliminary treatment to be given to threads or cords built to a certain specification and in a certain condition to produce certain results will have to be made only once, and that thereafter this preliminary treatment of the threads or cords is merely routine production work, which may be done at any suitable time and place.

It will be understood that the forming cores or other devices upon or by which the uncured casings are built up and prepared for the final curing moulds and the curing moulds themselves are to be made of such dimensions and proportions that when the casings are put into the final curing moulds and expanded to properly fill them, the threads or cords will have the desired tension.

Having thus described my invention, I claim:

1. A process of treating thread or cord to be used for making tires which consists of stretching it up to, approximately, the knee of its stress-strain curve and in releasing the stretching stress before it is embodied in a tire.

2. A process of treating thread or cord to be used for making tires which consist of stretching it beyond the knee of its stress-strain curve and heating it while it is so stretched and in releasing the stretching stress before it is embodied in a tire.

3. A process of treating thread or cord to be used for making tires which consists of stretching it beyond the knee of its stress-strain curve and pressing it while it is so stretched and in releasing the stretching stress before it is embodied in a tire.

4. A process of treating thread or cord to be used for making tires which consists of stretching it beyond the knee of its stress-strain curve and heating and pressing it while it is so stretched and in releasing the stretching stress before it is embodied in a tire.

5. A process of treating fabric prior to incorporating it in built-up fabric structures such as tires, belts and the like which consists of preliminarily stretching the threads or cords of the fabric up to approximately the knee of their stress-strain curve.

6. A process of treating fabric for making fabric and rubber tire casings which consists of stretching the fabric longitudinally of its threads or cords up to at least the knee of the stress-strain curve of said threads or cords, heating and pressing it while it is so stretched and rubberizing it and in releasing the stretching stress before it is incorporated in a tire casing.

7. A process of making fabric tire casings which consists of building up the casing from rubberized fabric the threads or cords of which have been preliminarily stretched a predetermined amount and given a permanent set and the stretching stress then released before being built into the casing and curing the built-up casing in a mould while said threads or cords are again subjected to stretching but to a lesser amount than said preliminary stretching.

8. A process of making fabric tire casings which consists of building up the casing from rubberized fabric the threads or cords of which have been preliminarily stretched a predetermined amount and given a permanent set and the stretching stress then released before being built into the casing, and curing the built-up casing in a mould while said casing is subjected to heat and internal pressure, the mould cavity being larger than said casing before it is cured and said internal pressure being sufficient to expand said casing to fill said mould cavity and again stretch the threads or cords of said casing but only to an amount less than said preliminary stretch.

9. The method of imparting true elasticity to cords and fabric, which comprises stretching said cord and fabric to the "knee" of its stress-strain characteristic, and in rubberizing said cord and fabric while under stretching stress and then releasing said stretching stress.

10. The method of imparting true elasticity to cords and fabric, which comprises stressing and straining said cord and fabric to the "knee" of its stress-strain characteristic, and in heating said cord and fabric while under said stress and strain, and then releasing said stress.

11. The method of imparting true elasticity to cords and fabric, which comprises stressing and straining said cord and fabric to the "knee" of its stress-strain characteristic, and in pressing said cord and fabric while under said stress and strain, and then releasing said stress.

12. The method of imparting true elasticity to cords and fabric, which comprises stressing and straining said cord and fabric to the "knee" of its stress-strain characteristic, and in heating and pressing said cord and fabric while under said stress and strain, and then releasing said stress.

13. A process of treating thread or cord to be used for making tires and the like, which comprises preliminarily stretching it approximately to the knee of its stress-strain curve, releasing the stretching stress, incorporating said thread or cord into a tire casing, and again stretching said thread or cord during the curing of the tire casing but only to an amount less than said preliminary stretch.

14. A process of treating thread or cord to be used for making tires and the like, which comprises preliminarily stretching it approximately to the knee of its stress-strain curve, treating it while under stress, releasing the stretching stress, incorporating said thread or cord into a tire casing, and again stretching said thread or cord during the curing of the tire casing but only to an amount less than said preliminary stretch.

15. A process of making tires, which comprises preliminarily stretching the thread or cord to be used therein to approximately the knee of its stress-strain curve, treating it while under stress, releasing the stretching stress, incorporating said thread or cord into a tire casing, again stretching the thread or cord during the curing of the casing, and effecting the curing in a mould by the air-bag method but modified from the standard practice by expanding the casing in a mould having a much reduced expansion space as compared with standard air-bag method practice for a given sized tire.

16. A process of making tires, which comprises preliminarily stretching the thread or cord until it acquires a permanent set, treating it while under stress, releasing the stretching stress, incorporating said thread or cord into a tire casing, curing said casing in a mould by the air-bag method but modified from the standard practice by expanding the casing in a mould having a reduced expansion space as compared with standard air-bag method practice for a given sized tire, whereby said thread or cord is stretched but to an amount less than said preliminary stretch.

17. The method of making a tire which comprises incorporating in a tire casing threads or cords to which have been imparted a permanent set by preliminarily stretching, curing said casing by the air-bag method but modified from the standard practice by expanding said casing in a mould having a reduced expansion space as compared with standard air-bag method practice for a given sized tire, whereby said threads or cords are stretched, but to an amount less than that required to give them said permanent set.

18. A process of making tires, which comprises stretching an uncured fabric to a certain degree to impart a preliminary set to the cords or threads thereof, reducing the tension, placing said preliminarily stretched fabric in a mould and curing said fabric by a modified air-bag method, said modified air-bag method comprising expanding an air bag in said mould to stretch the fabric a second time to an amount less than the above named certain degree, and curing said fabric while under the tension of the said second stretch.

19. A process of making tires, which comprises stretching or tensioning an uncured fabric to impart a preliminary set to the cords or threads thereof, reducing the tension, encompassing an air bag with said fabric, placing said fabric and air bag within a mould which mould provides room for the expansion of said fabric, expanding said air bag and thereby again stretching said fabric but only to an amount less than that required to impart said preliminary set, and curing said fabric in the mould while under the tension of said second stretch.

20. A process of making tire casings, which comprises placing an uncured casing, the cords or threads of whose fabric have been stretched to give them a preliminary set, in a mould and curing said casing by the air-bag method, said air-bag method modified by expanding said casing during the curing thereof a smaller amount in said mould than they were stretched to give them said preliminary set and a smaller amount than would be necessary in order to give the cords or threads of said casing the same tension during the curing process, had such preliminary set not been imparted to them.

21. A process of making pneumatic tire casings which comprises stretching the fabric cords or threads to impart to them a preliminary set before the casing is placed in the curing mould, inserting an air bag in the casing, and placing the casing embodying such preliminarily stretched fabric cords or threads and encompassing the air bag in a mould which provides room for expansion of said casing therein but only to an amount which will stretch the fabric cords or threads less than that required to give them said preliminary set, inflating the air bag to stretch the cords or threads of the casing to cause the casing to fill the mould, and curing the casing while thus inflated in the mould.

22. A process of treating fabric to be used in making tires, which comprises stretching its threads or cords a predetermined amount, rubberizing it while it is so stretched and releasing the stretching stress before it is embodied in a tire, and again stretching its threads or cords during the curing process in a mould after its embodiment in a tire, but only to an amount less than said first named stretching.

23. In the manufacture of pneumatic tire casings, the process of preliminarily stretching the threads or cords of the casing a predetermined amount to impart to them a preliminary set and substantially uniform elastic properties, releasing the stretching stress and again stretching the threads or cords of the casing during the curing process of the casing, but to an amount less than said preliminary stretch.

24. The steps in the process of manufacturing a pneumatic tire casing comprising preliminarily applying a predetermined stress to its threads or cords to stretch them and to impart to them a preliminary set, releasing the stretching stress and again stretching said threads or cords during the curing process of the casing, but to an amount less than that given them by said predetermined stress to impart said preliminary set.

In testimony whereof I affix my signature.

FRANK L. SESSIONS.